(12) United States Patent
Dixon et al.

(10) Patent No.: US 7,445,521 B2
(45) Date of Patent: Nov. 4, 2008

(54) SYSTEMS, DEVICES, AND METHODS FOR RESTRAINING CONDUCTORS

(75) Inventors: Joseph Scott Dixon, Suwanee, GA (US); Roland Joseph Montalbo, Cumming, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 252 days.

(21) Appl. No.: 11/460,468

(22) Filed: Jul. 27, 2006

(65) Prior Publication Data

US 2008/0026634 A1   Jan. 31, 2008

(51) Int. Cl.
H01R 9/22   (2006.01)

(52) U.S. Cl. .................. 439/719; 439/465; 174/72 A (58) Field of Classification Search .......... 439/449, 439/460, 465, 709, 719; 174/72 A, 135, 174/660

See application file for complete search history.

(56) References Cited

U.S. PATENT DOCUMENTS

| | | |
|---|---|---|
| 4,194,804 A | 3/1980 | Vinch |
| 4,775,121 A | 10/1988 | Carty |
| 4,960,394 A | 10/1990 | Marks |
| 4,998,343 A | 3/1991 | Costello |
| 5,057,650 A | 10/1991 | Urushibata |
| 5,072,071 A | 12/1991 | Cassity |
| 5,109,897 A | 5/1992 | Cassity |
| 5,234,358 A | 8/1993 | Polgar |
| 5,277,617 A | 1/1994 | Shasteen |
| 5,307,243 A | 4/1994 | Sharp |
| 5,328,386 A | 7/1994 | Frantz |
| 5,535,969 A | 7/1996 | Duffy, Jr. |
| 5,581,219 A | 12/1996 | Nozawa |
| 5,997,275 A | 12/1999 | Sarstedt |
| 6,726,503 B2 | 4/2004 | Waddell |
| 6,893,295 B1 | 5/2005 | Lloyd |

FOREIGN PATENT DOCUMENTS

| | | |
|---|---|---|
| DE | 4130603 A1 | 3/1993 |
| DE | 29512110 U1 | 9/1995 |

*Primary Examiner*—Khiem Nguyen (57) ABSTRACT

Certain exemplary embodiments comprise a retainer adapted to restrain a plurality of electrical conductors. The electrical conductors can be operably connectable to one or more circuit breakers. The retainer can be adapted to define a plurality of through-holes. Each of the plurality of through-holes can be adapted to nondestructively receive therethrough a conductor from the plurality of electrical conductors.

14 Claims, 10 Drawing Sheets

SYSTEMS, DEVICES, AND METHODS FOR RESTRAINING CONDUCTORS

BACKGROUND

U.S. Pat. No. 4,998,343 (Costello), which is incorporated by reference herein in its entirety, allegedly recites an "apparatus for aiding the routing of conductors into an electrical panel distribution box and connecting the conductors to corresponding circuit breaker terminals of an electrical distribution panel therein. The apparatus includes a terminal jig having an upper surface, an array of number-coded holes extending through the first plate, a plurality of odd-number indicia on the upper surface adjacent to the holes, respectively, the holes each having a diameter greater than an outside diameter of the conductors, and a clamp for attaching the first plate to the distribution panel housing. A plurality of the number-coded conductors of the first group are pulled through a conduit into an interior of a distribution panel housing. The terminal jig is attached by the clamp to a lower front lip of the housing. The free ends of the conductors are inserted through correspondingly numbered holes in the terminal jig. The electrical power distribution panel is installed in the distribution panel housing. The conductors are withdrawn, one at a time, from the terminal jig and are electrically connected to correspondingly numbered terminals of circuit breakers of the electrical power distribution panel." See Abstract.

U.S. Pat. No. 6,726,503 (Waddell), which is incorporated by reference herein in its entirety, allegedly recites an "electrical connector assembly is provided for terminating a plurality of electrical wires. A non-conductive connector housing mounts a plurality of signal terminals. A wire management module includes a non-conductive body mounting a plurality of ground terminals. The body positions a plurality of signal conductors and a plurality of ground conductors of the electrical wires, the ground conductors being terminated to the ground terminals. The ground terminals interengage with the connector housing to mount the wire management module to the housing with the signal wire conductors in position for termination to the signal terminals." See Abstract.

U.S. Pat. No. 6,893,295 (Lloyd), which is incorporated by reference herein in its entirety, allegedly recites a "connector for connecting cables to a pin header has a connector body portion that incorporates a strain relief member applied to the cables as part of the connector body portion. The strain relief member includes a cable clamp having a series of grooves that are separated by intervening land portions. The grooves receive the cables and particularly space them. A stop is formed in the clamp to isolate the cable end. The leads of the cable are terminated to corresponding tail portions of contacts of the connector. These tail portions are maintained in the same plane to enhance the electrical performance of the connector. An insulative material is molded over the tail portions and the cable clamp to form a connector with a cable clamp formed integrally with the body of the connector." See Abstract.

SUMMARY

Certain exemplary embodiments comprise a retainer adapted to restrain a plurality of electrical conductors. The electrical conductors can be operably connectable to one or more circuit breakers. The retainer can be adapted to define a plurality of through-holes. Each of the plurality of through-holes can be adapted to nondestructively receive therethrough a conductor from the plurality of electrical conductors.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapted to—made suitable or fit for a specific use or situation.

adapter—a device used to effect operative compatibility between different parts of one or more pieces of an apparatus or system.

after—following in time and/or subsequent to.

apparatus—an appliance or device for a particular purpose.

assembly—a plurality of coupled components.

associated with—related to.

attach—to fasten, secure, couple, and/or join.

attachable—capable of being fastened, secured, coupled, and/or joined.

axis—a line substantially defined by two points and extending approximately from a defined point of origin.

before—preceding in time and/or prior to.

bottom—below relative to a predetermined orientation of an object.

bus bar—a common electrical power terminal to which multiple circuits are electrically coupled through either fuses or circuit breakers.

can—is capable of, in at least some embodiments.

circuit breaker—a device adapted to automatically open an alternating current electrical circuit.
comprise—to include, but not be limited to.
comprising—including but not limited to.
conductor—substantially capable of transferring electricity from a first location to a second location.
configured to—made suitable or fit for a specific use or situation.
connect—to join or fasten together.
couple—to join, connect, and/or link together.
coupleable—capable of being joined, connected, and/or linked together.
coupling—linking in some fashion.
define—to establish the outline, form, or structure of.
device—a machine, manufacture, and/or collection thereof.
direction—a distance independent relationship between two points in space that specifies the position of either with respect to the other; the relationship by which the alignment or orientation of any position with respect to any other position is established.
double-flip symmetrical snap lock—a securing system comprising two pairs of snapably interlockable notches. In certain embodiments, when interlocked, and when viewing a cross-section cut perpendicularly to faces of the notches, one pair of notches is symmetrical when considered as flipped across two mutually orthogonal fold lines (i.e., when rotated 180 degrees; i.e., 2-fold rotationally symmetrical) with respect to the other pair.
electrical—pertaining to electricity.
electrical panel—a housing adapted to contain electrical components, such as a circuit interrupter, meter, and/or circuit breaker, adapted to manage electrical energy to an electrical device and/or in a circuit.
end—an extremity of something that defines a length.
form—to create and/or define.
greater—comparatively higher in magnitude.
identify—to ascertain one or more characteristics of.
increase—to become greater or more in size, quantity, number, degree, value, intensity, and/or power, etc.
install—to connect or set in position and prepare for use.
level—a relative position on a scale.
made—produced.
may—is allowed and/or permitted to, in at least some embodiments.
medial—situated approximately in a middle portion of an object.
method—a process, procedure, and/or collection of related activities for accomplishing something.
motion—changing position or place.
mount—to fixedly attach.
non-destructively—performed in a manner leaving an object substantially intact.
operably connectable—capable of being connected in at least one operative embodiment.
operably energizable—capable of receiving electrical energy.
orientation—a location relative to something else.
part—component.
perpendicular—substantially at a right angle with respect to a defined line or defined plane.
plurality—the state of being plural and/or more than one.
portion—a definable piece or section.
predetermined—established in advance.
provide—to furnish and/or supply.
receive—to take, get, acquire, and/or have bestowed upon.
releasably—capable of being freed, in a substantially non-destructive manner, from something that binds, fastens, or holds back.
repeatedly—again and again; repetitively.
require—to make necessary.
restrain—to limit and/or restrict.
retain—to restrain motion of in at least one direction.
retainer—a device adapted to restrain motion of one object relative to another object in at least one direction.
route—to direct on a path.
safety label—an item adapted to provide information related to one or more hazards.
sensor—a device or system adapted to detect or perceive automatically.
separation—(n.) a defined space between.
separation—(v.) an act of dividing or disconnecting.
serpentine shaped—characterized by an undulating contour.
set—a related plurality.
side—a surface of an object, especially a surface joining a top and bottom.
single-flip symmetrical snap lock—a securing system comprising two pairs of snapably interlockable notches. In certain embodiments, when interlocked, and when viewing a cross-section cut perpendicularly to faces of the notches, one pair of notches is symmetrical when considered as flipped across a single fold line (i.e., a mirror image) to the other pair. Thus, when interlocked, the cross-sectional view has a single axis of symmetry or line of reflection.
slidably—to be able to open, close, and/or fit together with a sliding motion of a first part relative to a second part.
snapably—to be able to open, close, and/or fit together with a click.
space—a gap.
substantially—to a great extent or degree.
substrate—an underlying layer.
support—to bear the weight of, especially from below.
system—a collection of mechanisms, devices, data, and/or instructions, the collection designed to perform one or more specific functions.
therethrough—substantially passing an entire aperture.
thermoplastic—a polymeric substance that can be softened by heat and hardened by cooling in a reversible physical process such as, for example, GE Noryl SE1-X (available from GE Plastics, of Pittsfield, Mass.) and/or Asahi Xyron 540V (available from Asahi Kasei America Inc., of New York, N.Y.), etc.
through-hole—an aperture defining substantially constant cross sectional shape along a longitudinal axis of each aperture.
tool—a device adapted to perform or facilitate mechanical work.
top—above relative to a predetermined orientation of an object.
via—by way of and/or utilizing.
volt—a unit of electrical potential. One volt is an amount of force required to send one ampere of electrical current through a resistance of one ohm.
without—lacking.

DETAILED DESCRIPTION

Certain exemplary embodiments provide a retainer adapted to restrain a plurality of electrical conductors. The electrical conductors can be operably connectable to one or more circuit breakers. The retainer can be adapted to define a plurality of through-holes. Each of the plurality of through-holes can be adapted to nondestructively receive therethrough a conductor from the plurality of electrical conductors.

Figure 1:
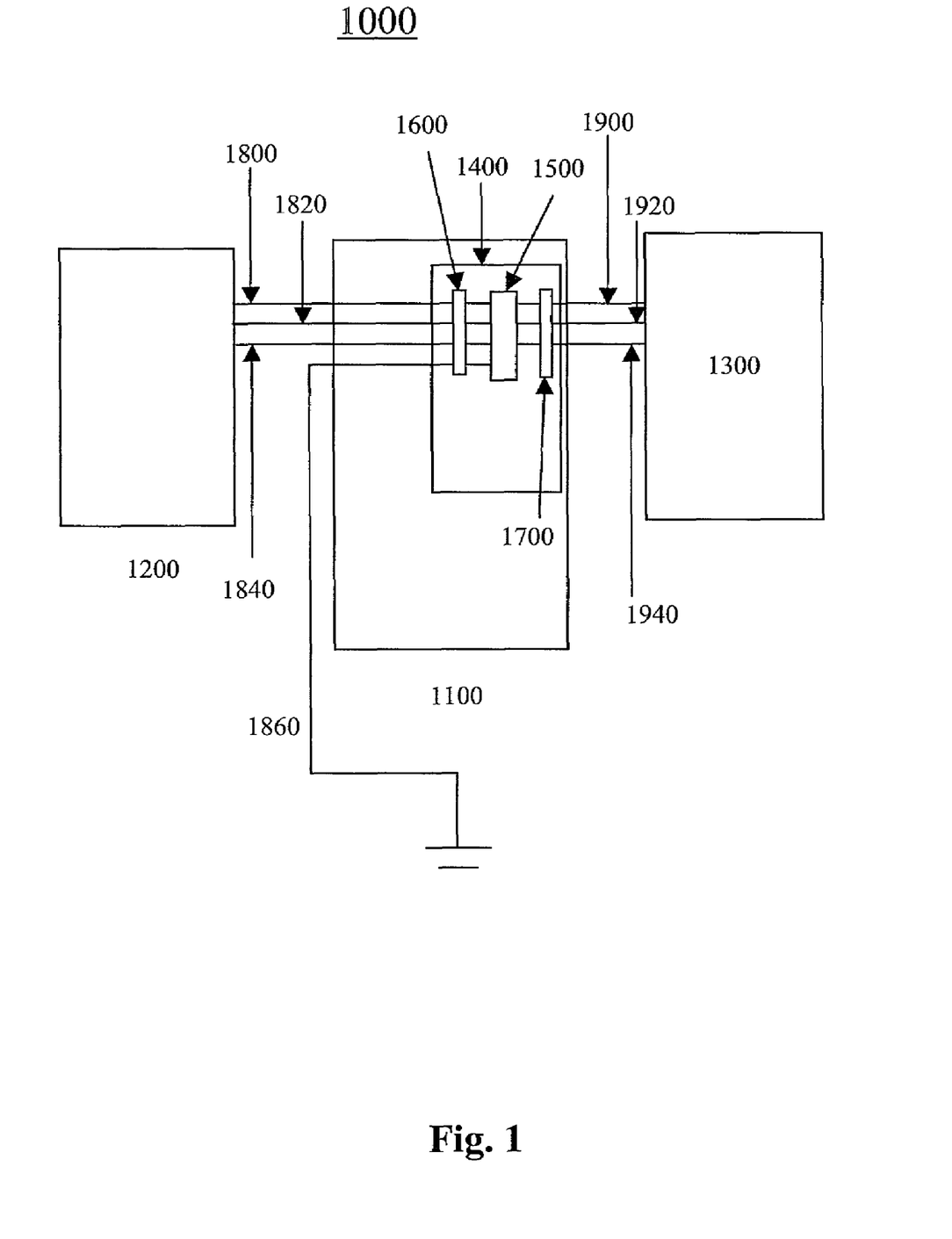
FIG. 1 is a block diagram of an exemplary embodiment of a system 1000.

FIG. 1 is a block diagram of an exemplary embodiment of a system 1000, which can comprise an electrical panel 1100. Electrical panel 1100 can be utilized to electrically couple an electrical source 1200 to an electrical load 1300. Electrical load 1300 can be associated with a home, factory, office building, commercial warehouse, store, government building, construction site, sports facility, mobile plant, camp site, recreational facility, trailer home, emergency site, and/or farm, etc.

Electrical panel 1100 can comprise a basepan 1400 and/or one or more circuit breakers, such as circuit breaker 1500. Circuit breaker 1500 can be operably energizable by 100 volts or greater. A first plurality of electrical conductors can electrically couple electrical source 1200 to circuit breaker 1500. The first plurality of electrical conductors can comprise a first source conductor 1800, a second source conductor 1820, and a third source conductor 1840. A ground 1860 can be electrically coupled to circuit breaker 1500. A first retainer 1600 can be snapably coupled to, and adapted to restrain, first source conductor 1800, second source conductor 1820, third source conductor 1840, and/or ground 1860. First retainer 1600 can define corresponding through-holes through which each of first source conductor 1800, second source conductor 1820, third source conductor 1840, and/or ground 1860 can pass. First retainer 1600 can be adapted to provide a separation between each of first source conductor 1800, second source conductor 1820, third source conductor 1840, and/or ground 1860 in a vicinity of circuit breaker 1500. By providing a separation, first retainer 1600 can be adapted to reduce a probability of a short circuit condition between two or more of first source conductor 1800, second source conductor 1820, third source conductor 1840, and/or ground 1860. Each of first source conductor 1800, second source conductor 1820, third source conductor 1840, and/or ground 1860 can be operably connectable to one or more circuit breakers, such as circuit breaker 1500.

A second plurality of electrical conductors can electrically couple electrical load 1300 to circuit breaker 1500. The second plurality of electrical conductors can comprise a first load conductor 1900, a second load conductor 1920, and a third load conductor 1940. A second retainer 1700 can be snapably coupled to, and adapted to restrain, first load conductor 1900, second load conductor 1920, and third load conductor 1940. In certain exemplary embodiments, ground 1860 can be coupled to second retainer 1700. Second retainer 1700 can define corresponding through-holes through which each of first load conductor 1900, second load conductor 1920, third load conductor 1940, and/or ground 1860 can pass. Second retainer 1700 can be adapted to provide a separation between each of first load conductor 1900, second load conductor 1920, third load conductor 1940, and/or ground 1860 in a vicinity of circuit breaker 1500. By providing a separation, second retainer 1700 can be adapted to reduce a probability of a short circuit condition between two or more of first load conductor 1900, second load conductor 1920, third load conductor 1940, and/or ground 1860. Each of first load conductor 1900, second load conductor 1920, and/or third load conductor 1940 can be operably connectable to one or more circuit breakers, such as circuit breaker 1500.

First retainer 1600 can comprise a first half and a second half, which can be snapably coupleable such that each half of first retainer 1600 is restrained in motion with respect to the other half. Second retainer 1700 can comprise a first half and a second half, which can be snapably coupleable such that each half of second retainer 1700 is restrained in motion with respect to the other half. Having a two-half snap-fit assembly for first retainer 1600 and/or second retainer 1700 can allow an installation to take place after conductors are connected to circuit breaker 1500. An electrical coupling of conductors to circuit breaker 1500 prior to installation of first retainer 1600 and/or second retainer 1700 can improve relative installation ease due to increased conductor flexibility. First retainer 1600 and/or second retainer 1700 can restrain opposite polarity conductors from making contact with each other. Conductors can be separated from each other by first retainer 1600 and/or second retainer 1700 at a location at a predetermined distance, such as approximately one inch from circuit breaker 1500.

First retainer 1600 and/or second retainer 1700 can be utilized in replacing circuit breaker 1500 in the field to improve safety. First retainer 1600 and/or second retainer 1700 can be utilized in assembling a new electrical system 1000 comprising circuit breaker 1500 to facilitate installation of first source conductor 1800, second source conductor 1820, third source conductor 1840, first load conductor 1900, second load conductor 1920, third load conductor 1940, and/or ground 1860. First retainer 1600 and/or second retainer 1700 can be relatively rigid and/or injection molded. First retainer 1600 and/or second retainer 1700 can be designed such that creep and distortion is relatively small in magnitude. First retainer 1600 and/or second retainer 1700 can be beam shaped.

Figure 2:
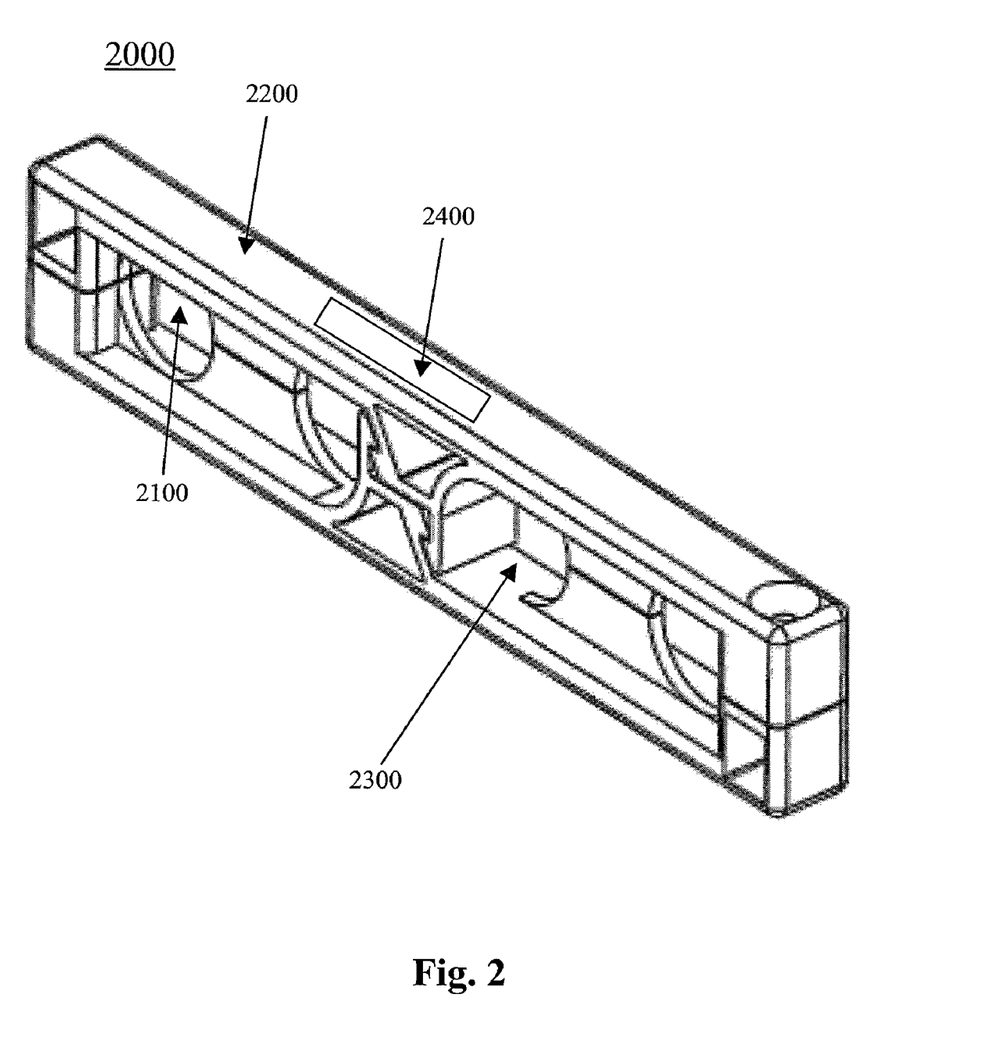
FIG. 2 is a perspective view of an exemplary embodiment of a retainer 2000.

FIG. 2 is a perspective view of an exemplary embodiment of a retainer 2000, which can be made of plastic and/or any other snapably coupleable material. Retainer 2000 can comprise a safety label 2400, which can be adapted to identify an orientation and/or location of conductors.

In certain exemplary embodiments, retainer 2000 can be adapted to keep two or more conductors separated and/or to keep the two or more conductors from making contact with each other during circuit breaker replacement or removal. In certain exemplary embodiments, retainer 2000 can utilize a two-part snap-fit assembly, which can facilitate an alignment of conductors for electrically coupling to the circuit breaker. In certain exemplary embodiments, retainer 2000 can comprise a single openable part, which can comprise two hinged parts. Thus, retainer 2000 can comprise a first part 2200, which can define a first set of channels. Retainer 2000 can comprise second part 2300, which can define a second set of channels. First part 2200 can be snapably coupleable to second part 2300 to mate the first set of channels with the second set of channels thereby forming a plurality of through-holes 2100. In the orientation illustrated in FIG. 2, first part 2200 can be a top portion of retainer 2000 and second part 2300 can be a bottom portion. In a rotated orientation, first part 2200 can be a side portion of retainer 2000. First part 2200 and second part 2300 can be snapably coupleable without a tool. Once snapably coupled, first part 2200 and second part 2300 can be relatively difficult to separate without a tool.

Each of plurality of through-holes 2100 can be adapted to nondestructively receive therethrough a single conductor from a plurality of electrical conductors. Through-holes 2100 can be larger than corresponding conductors. In certain exemplary embodiments, conductors can be held in place, relative to other conductors, by the structure of retainer 2000.

In certain exemplary embodiments, retainer 2000 can be a two-part assembly, which can utilize snaps to interlock each of the two parts. Thus, retainer 2000 can be made of two snapably coupleable parts. The two plastic parts can be substantially similar in design and/or construction. Retainer 2000 can comprise three points of fastening, one at each end and one intermediate.

In certain exemplary embodiments, retainer 2000 can be a hinged one-part assembly adapted to be snapably closed to define plurality of through-holes 2100. Such embodiments can comprise a point of fastening at the unhinged end of retainer 2000 as well as an intermediate point of fastening.

Figure 5:
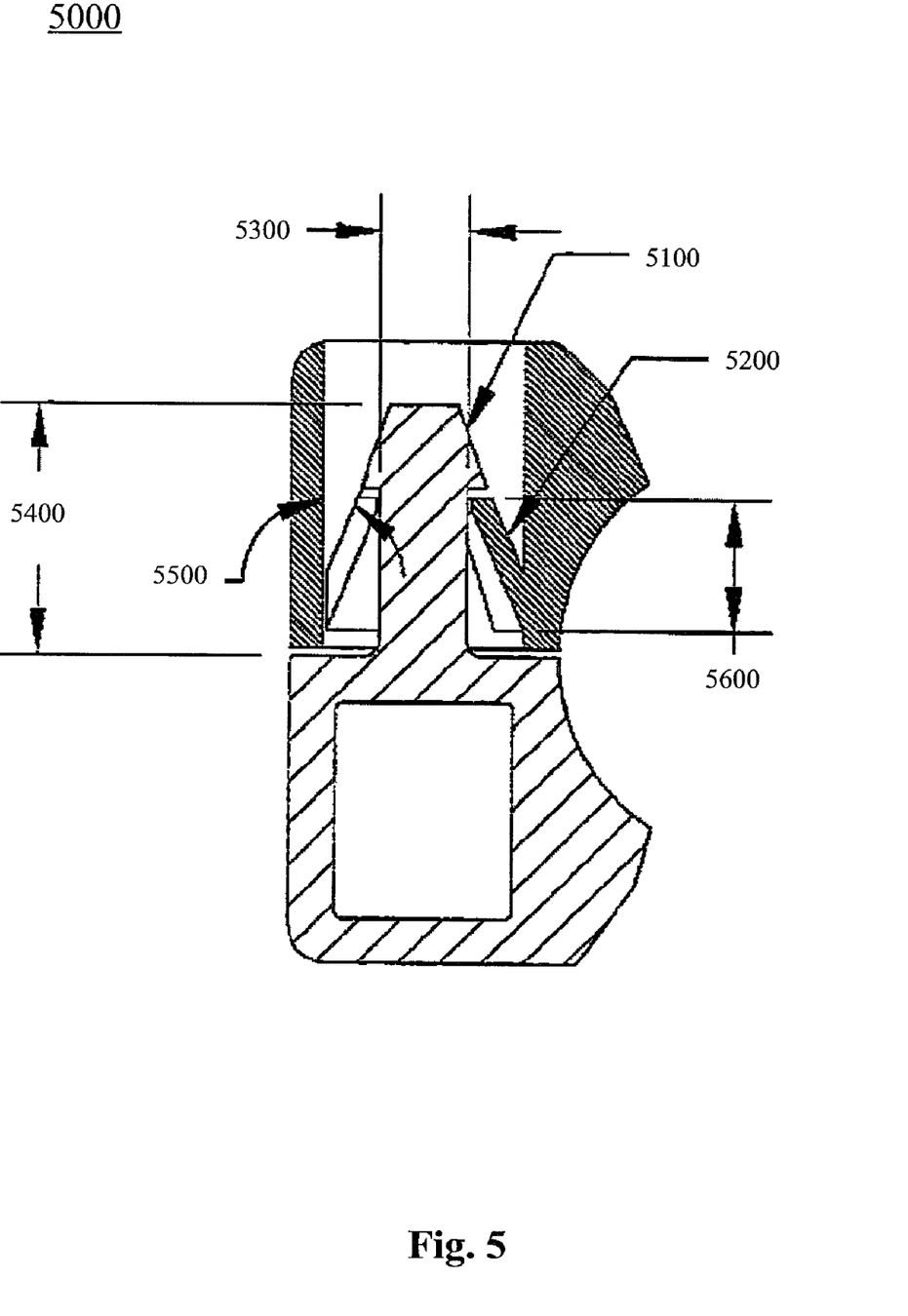
FIG. 5 is a sectional view of an exemplary embodiment of a single-flip symmetrical snap lock 5000.

In certain exemplary embodiments, Retainer 2000 can comprise a single-flip symmetrical snap lock on at least one end, such as single-flip symmetrical snap lock 5000 illustrated in FIG. 5. In certain exemplary embodiments, retainer 2000 can comprise a single-flip symmetrical snap lock on each end.

Retainer 2000 can define plurality of through-holes 2100. Plurality of through-holes 2100 can have a similar spacing to that of terminals of a corresponding circuit breaker. Each snapable lock comprised by retainer 2000 can be adapted for installation without utilizing tools or machinery. Once snapably coupled, each snapable lock of retainer 2000 can be sufficiently strong to make separation difficult without tools. Parts of retainer 2000 can be made of a thermoplastic material. Retainer 2000 can comprise safety labeling to identify orientation of installed conductors. In certain exemplary embodiments, the retainer can comprise an intermediate double-flip symmetrical snap lock, such as double-flip symmetrical snap lock 6000 illustrated in FIG. 6. Once snapably coupled, the retainer can be designed to remain in a coupled state.

Certain exemplary embodiments of retainer 2000 can utilize two snapably coupleable parts that are substantially flat and adapted to install from side to side instead of top to bottom.

After electrically coupling conductors of opposite polarity to the circuit breaker, a first part of retainer 2000 can be held over the conductors while keeping associated half through-holes aligned with respective conductors. A second part of retainer 2000 can be positioned under and aligned with the conductors. The first part of retainer 2000 can then be snapably coupled to the second part of retainer 2000. Once retainer 2000 is assembled over and around the conductors, retainer 2000 can be slid to adjust a location of retainer 2000 relative to the circuit breaker. Retainer 2000 can be snapably coupled while electrically coupling conductors of proper polarity to corresponding circuit breaker terminals.

Figure 3:
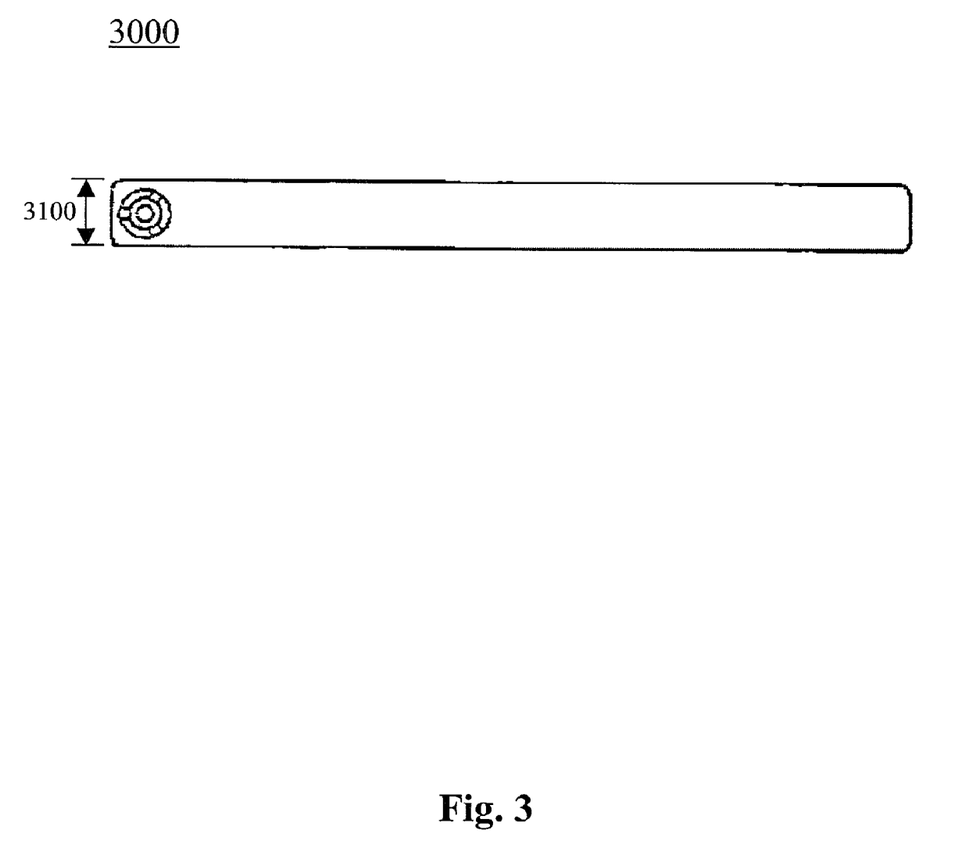
FIG. 3 is a plan view of an exemplary embodiment of a retainer 3000.

FIG. 3 is a plan view of an exemplary embodiment of a retainer 3000, which can be characterized by a width 3100. Width 3100 can be approximately, in inches, 0.1, 0.125, 0.29, 0.34, 0.657, 0.975, 1, 1.26, 1.887, 2, 3.5, 4, and/or any value or subrange therebetween.

Figure 4:
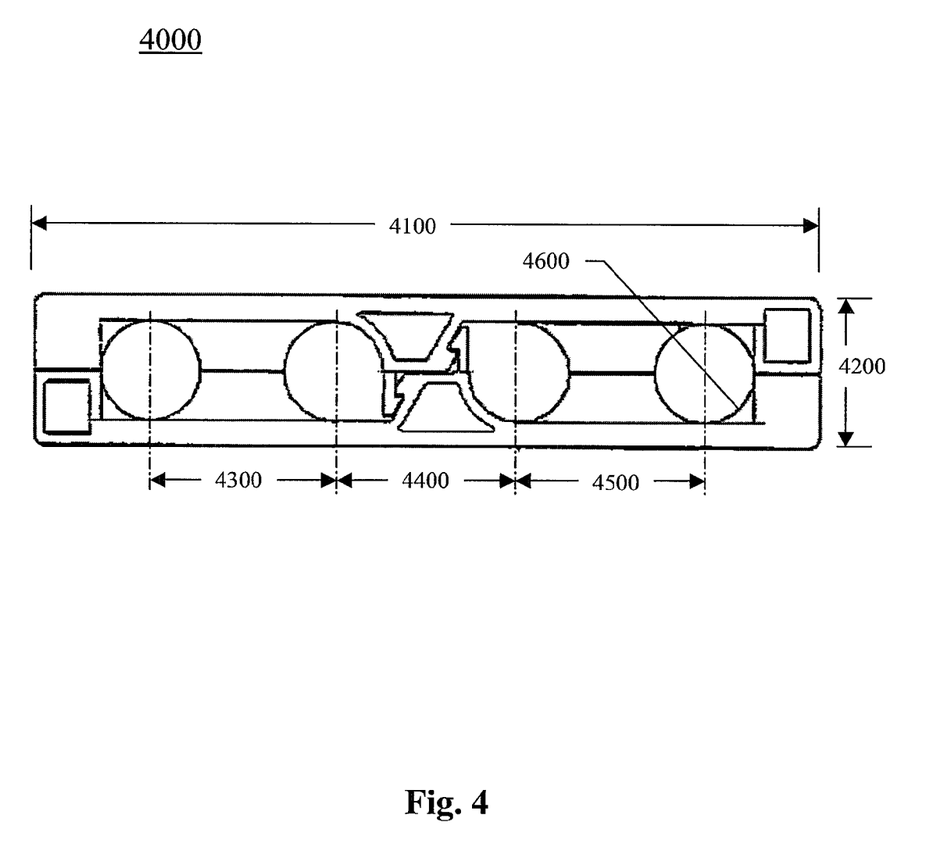
FIG. 4 is a side view of an exemplary embodiment of a retainer 4000.

FIG. 4 is a side view of an exemplary embodiment of a retainer 4000, which can be characterized by a length 4100. Length 4100 can be approximately, in inches, 1, 1.175, 2.26, 3, 4.25, 6.975, 7, 8.62, 10.875, 12, and/or any value or subrange therebetween. Retainer 4000 can be characterized by a thickness 4200, which can be approximately, in inches, 0.12, 0.25, 0.35, 0.590, 0.75, 0.83, 1.65, 1.88, 2.3, 3, and/or any value or subrange therebetween. Retainer 4000 can define a plurality of through-holes, each of which can be characterized by a diameter 4600. The diameters of the plurality of through-holes can be similar and/or different from each other. Diameter 4600 can be approximately, in inches, 0.125, 0.27, 0.4, 0.540, 0.75, 0.9, 1.25, 1.66, 2.5, 3, and/or any value or subrange therebetween. The plurality of through-holes can be characterized by spacings such as first spacing 4300, second spacing 4400, and third spacing 4500. First spacing 4300, second spacing 4400, and/or third spacing 4500 can be approximately, in inches, 0.5, 0.67, 0.84, 1.060, 1.75, 1.80, 1.820, 2.66, 2.5, 3.5, and/or any value or subrange therebetween.

FIG. 5 is a sectional view of an exemplary embodiment of a single-flip symmetrical snap lock 5000, which can comprise an end snap 5100 and an end snap receiver 5200. Single-flip symmetrical snap lock 5000 can be characterized by an end snap width 5300, which can be approximately, in inches, 0.02, 0.05, 0.094, 0.115, 0.166, 0.22, 0.3, 0.56, 0.61, 0.75, and/or any value or subrange therebetween. Single-flip symmetrical snap lock 5000 can be characterized by an end snap length 5400, which can be approximately, in inches, 0.09, 0.15, 0.229, 0.335, 0.467, 0.6, 0.723, 0.88, 1.16, 1.25, and/or any value or subrange therebetween. Single-flip symmetrical snap lock 5000 can be characterized by an end snap receiver length 5600, which can be approximately, in inches, 0.05, 0.092, 0.11, 0.174, 0.222, 0.37, 0.429, 0.55, 0.6, 0.75, and/or any value or subrange therebetween. Single-flip symmetrical snap lock 5000 can be characterized by an end snap receiver angle 5500, which can be approximately, in degrees, 7.5, 10.12, 14, 23, 31.22, 35.7, 36, 39.99, 41.2, 45, and/or any value or subrange therebetween.

Single-flip symmetrical snap lock 5000 can be designed such that an installer might not utilize any tools or machines. Once snapably coupled, single-flip symmetrical snap lock 5000 can be relatively difficult to separate without tools. Relatively secure retention by single-flip symmetrical snap lock 5000 can provide a securement that is relatively resistant to separation once installed, thereby keeping energized electrical conductors separated.

Figure 6:
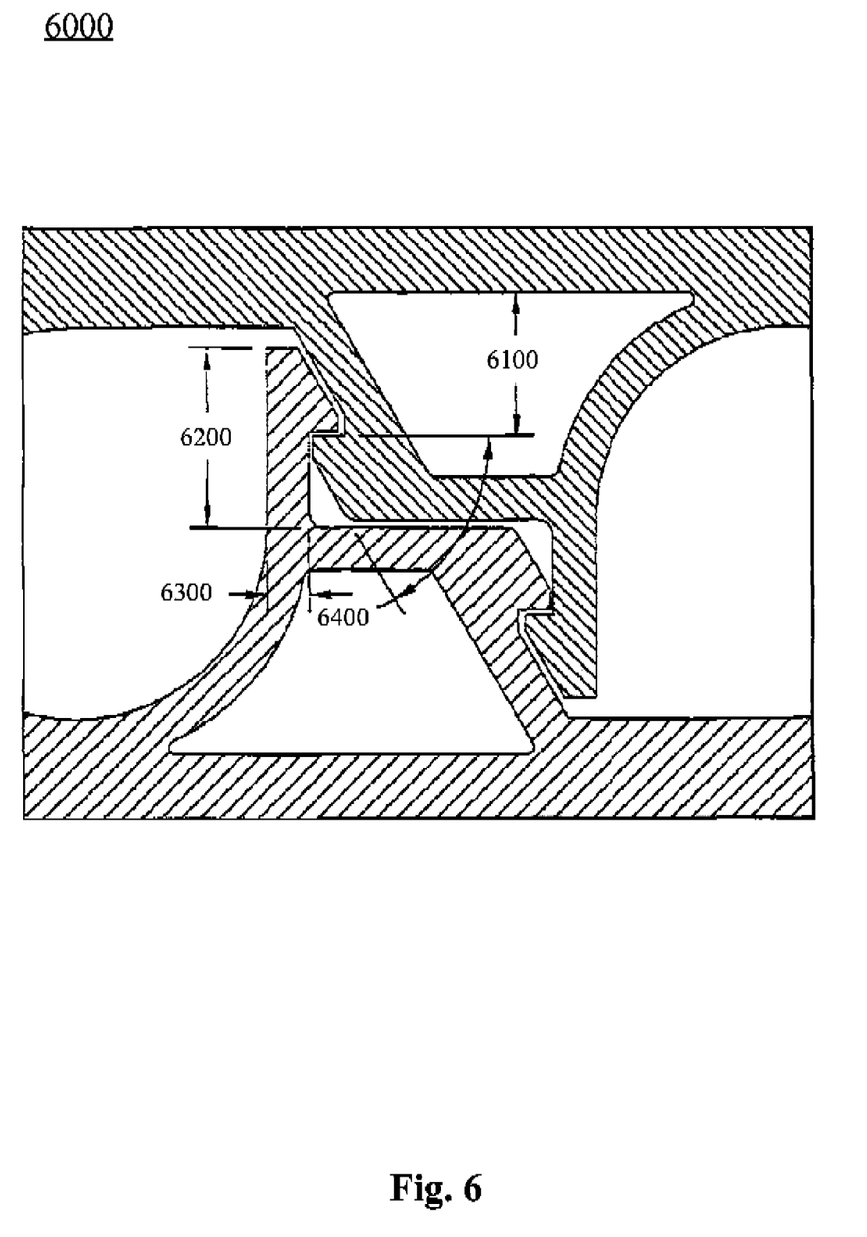
FIG. 6 is a sectional view of an exemplary embodiment of a double-flip symmetrical snap lock 6000.

FIG. 6 is a sectional view of an exemplary embodiment of a double-flip symmetrical snap lock 6000, which can be characterized by a first snap lock depth 6100. First snap lock depth 6100 can be approximately, in inches, 0.05, 0.092, 0.11, 0.174, 0.222, 0.37, 0.429, 0.55, 0.6, 0.75, and/or any value or subrange therebetween. Double-flip symmetrical snap lock 6000 can be characterized by a second snap lock depth 6200, which can be approximately, in inches, 0.05, 0.109, 0.123, 0.174, 0.25, 0.333, 0.472, 0.65, 0.77, 1.0, and/or any value or subrange therebetween. Double-flip symmetrical snap lock 6000 can be characterized by a snap lock thickness 6300, which can be approximately, in inches, 0.02, 0.031, 0.039, 0.04, 0.06, 0.099, 0.10, 0.165, 0.177, 0.25, and/or any value or subrange therebetween. Double-flip symmetrical snap lock 6000 can be characterized by a snap lock angle 6400, which can be approximately, in degrees, 45, 52.3, 55.1, 57, 59.6, 60, 65.6, 68.7, 77.2, 85, and/or any value or subrange therebetween.

Figure 7:
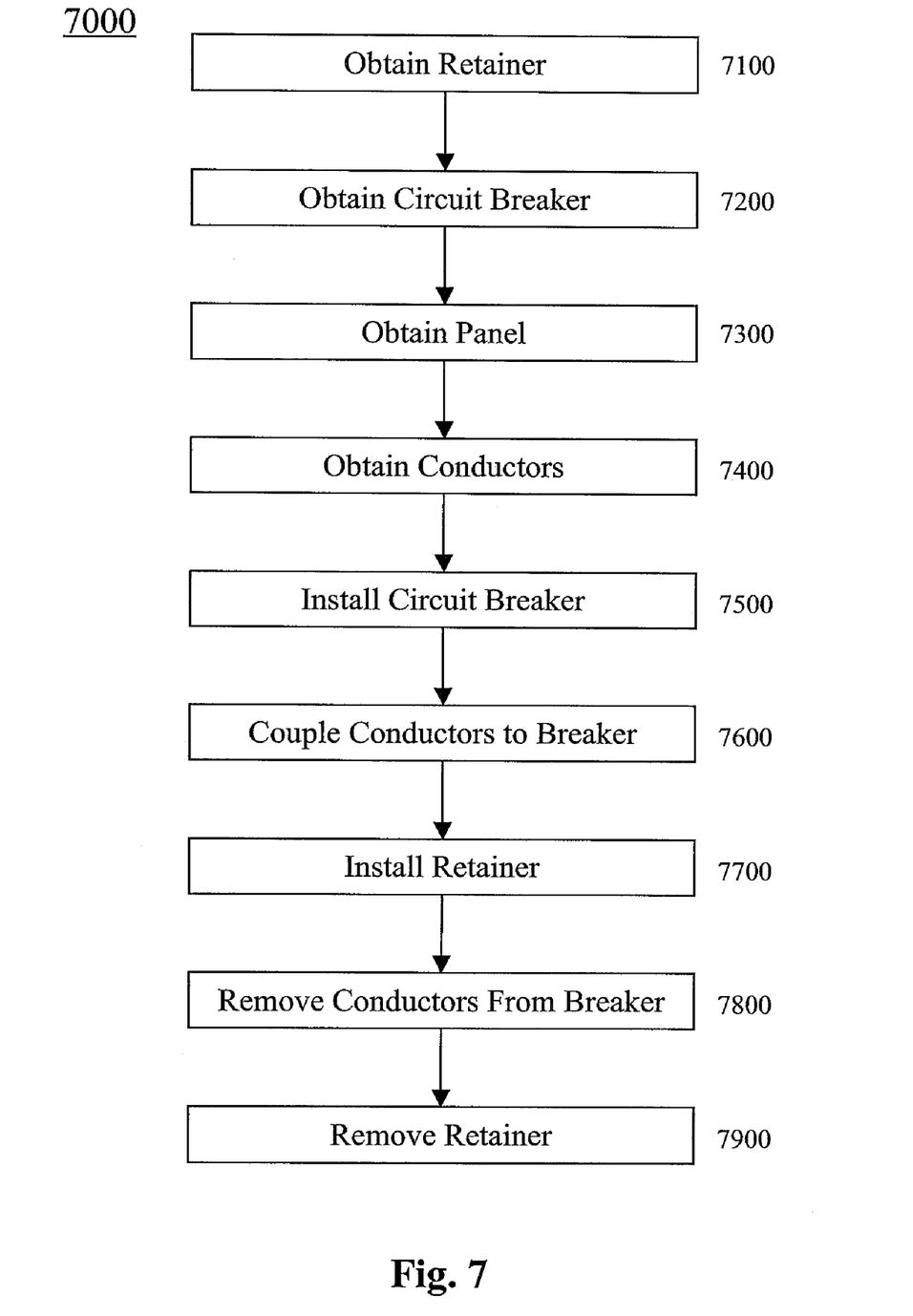
FIG. 7 is a flowchart of an exemplary embodiment of a method 7000.

FIG. 7 is a flowchart of an exemplary embodiment of a method 7000. At activity 7100, a retainer can be provided and/or obtained. The retainer can be adapted to define a plurality of through-holes. Each of the plurality of through-holes can be adapted to nondestructively receive therethrough a single conductor from a plurality of electrical conductors. The retainer can comprise a first part, which can define a first set of channels. The retainer can comprise a second part, which can define a second set of channels. The first part can be snapably coupleable to the second part to mate the first set of channels with the second set of channels thereby forming the plurality of through-holes At activity 7200, a circuit breaker can be provided and/or obtained. The circuit breaker can be operably energizable by electrical energy of 100 volts or greater.

At activity 7300, an electrical panel can be provided and/or obtained.

At activity 7400, the plurality of electrical conductors can be provided and/or obtained. The plurality of electrical conductors can be operably connectable to the circuit breaker.

At activity 7500, the circuit breaker can be installed in the electrical panel. At activity 7600, the plurality of electrical conductors can be installed to corresponding terminals of the circuit breaker.

At activity 7700, the retainer can be installed. In certain exemplary embodiments, the retainer can be installed after the plurality of electrical conductors is operably connected to the circuit breaker. In certain exemplary embodiments, the retainer can be installed before the plurality of electrical conductors is operably connected to the circuit breaker. In certain exemplary embodiments, the retainer can be installed approximately one inch from the circuit breaker. The retainer can be adapted to restrain two or more of the plurality of electrical conductors, thereby reducing a probability of a short circuit between two or more of the plurality of electrical conductors. In certain exemplary embodiments, the retainer can be installed substantially without tools At activity 7800, conductors can be removed from the circuit breaker. In certain exemplary embodiments, the conductors can be deenergized prior to removal from terminals of the circuit breaker.

At activity 7900, the retainer can be removed. In certain exemplary embodiments, one or more tools can be utilized to separate two parts of the retainer.

Figure 8:
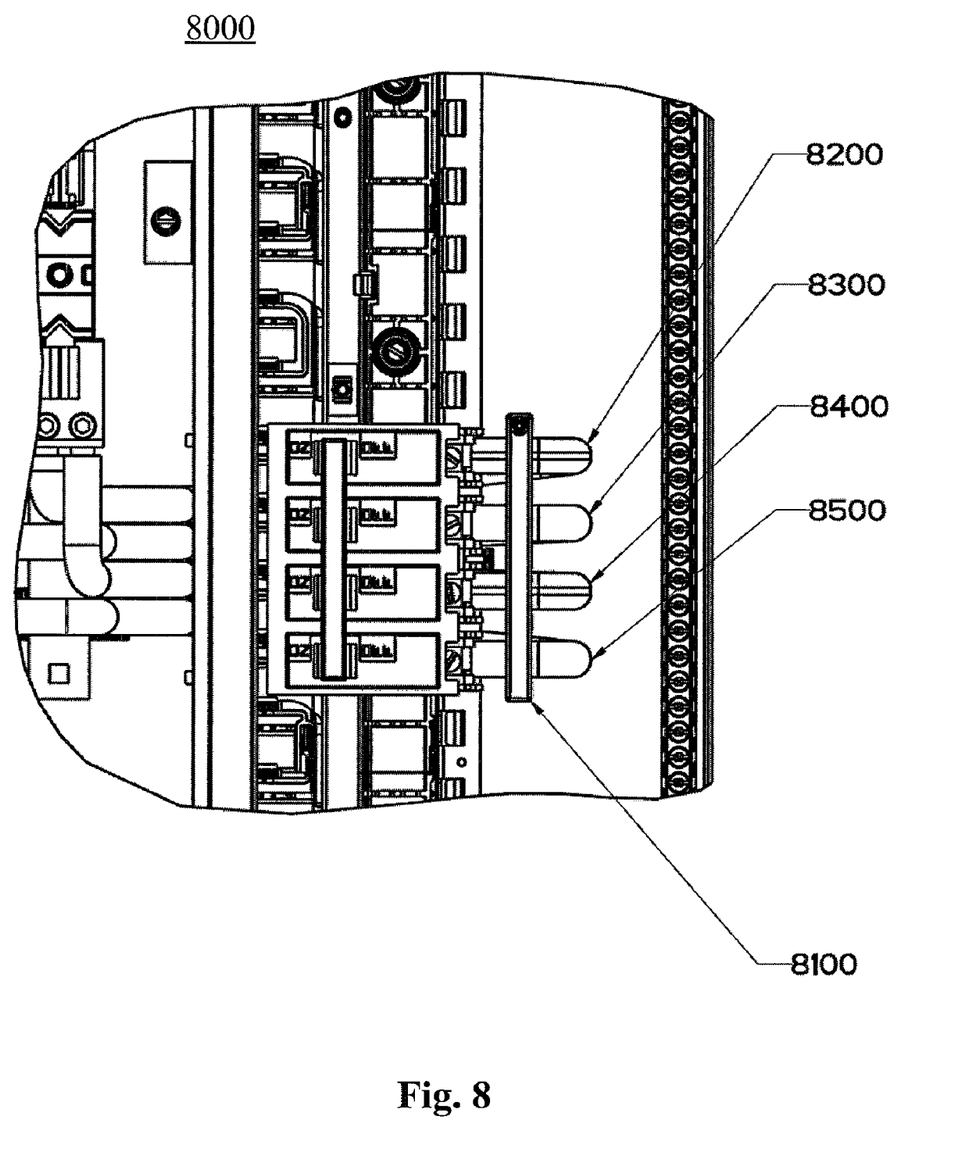
FIG. 8 is a block diagram of an exemplary embodiment of a system 8000.

FIG. 8 is a block diagram of an exemplary embodiment of a system 8000, which can comprise a retainer 8100. Retainer 8100 can be adapted to restrain a plurality of electrical conductors such as a first electrical conductor 8200, a second electrical conductor 8300, a third electrical conductor 8400, and a fourth electrical conductor 8500.

Figure 9:
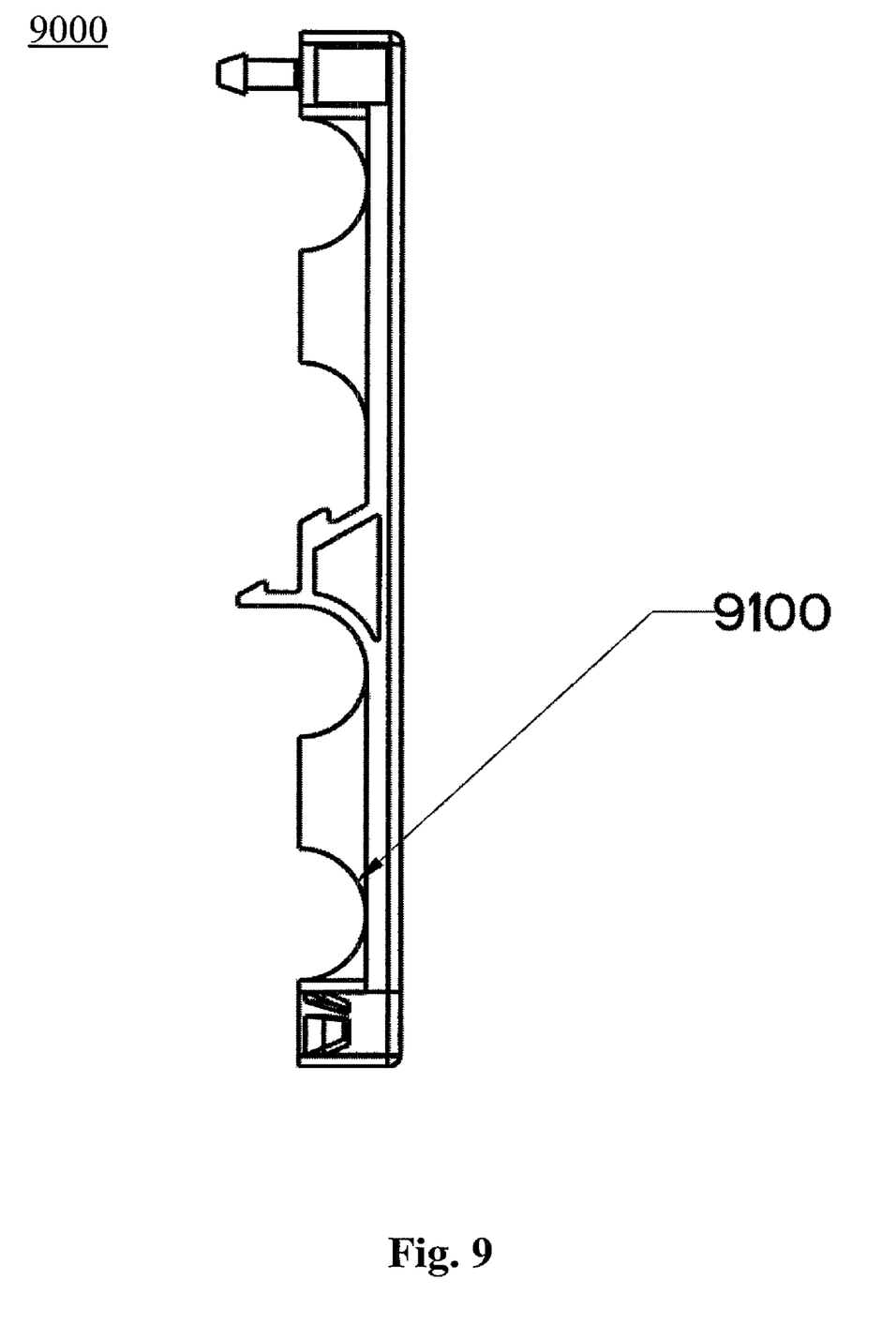
FIG. 9 is a side view of an exemplary embodiment of a part of a retainer 9000.

FIG. 9 is a side view of an exemplary embodiment of a part of a retainer 9000, which can comprise a set of channels, such as channel 9100.

Figure 10:
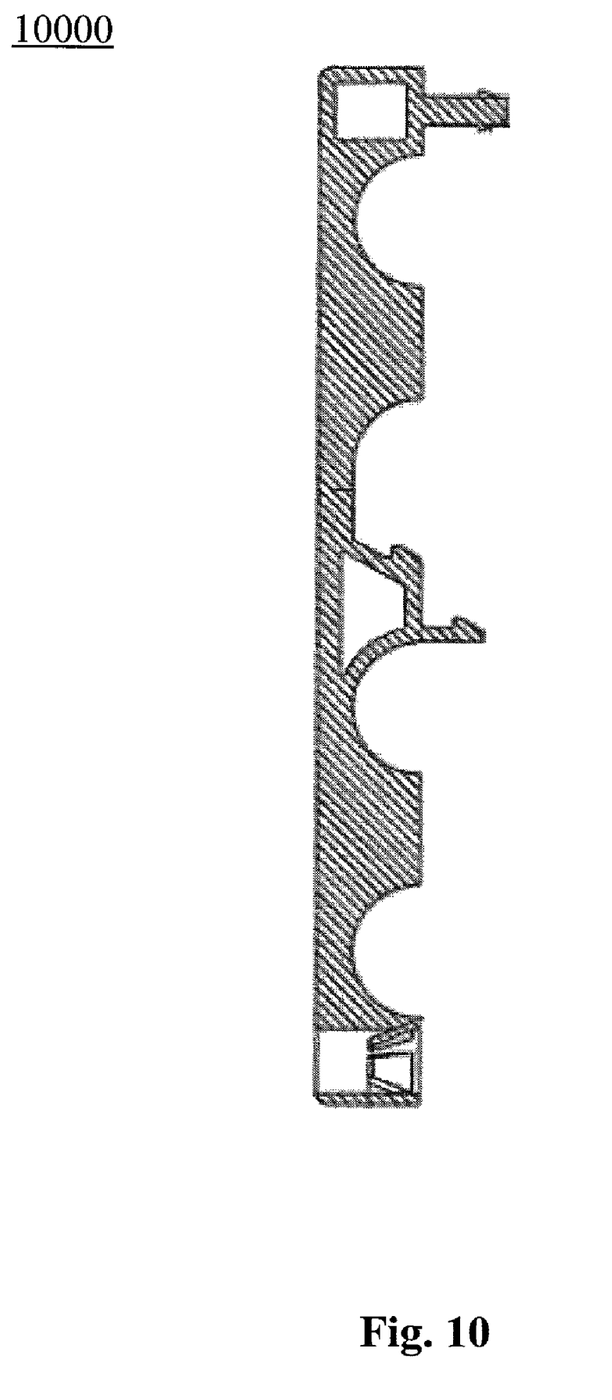
FIG. 10 is a sectional view of an exemplary embodiment of an exemplary embodiment of a part of a retainer 10000.

FIG. 10 is a sectional view of an exemplary embodiment of an exemplary embodiment of a part of a retainer 10000. Note Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising: a retainer adapted to restrain a plurality of electrical conductors, the electrical conductors operably connectable to one or more circuit breakers operably energizable by 100 volts or greater, said retainer adapted to define a plurality of through-holes, each of said plurality of through-holes adapted to nondestructively receive therethrough a single conductor from said plurality of electrical conductors, said retainer comprising: a first part defining a first set of channels; and a second part defining a second set of channels, said first part snapably coupleable to said second part to mate said first set of channels with said second set of channels thereby forming said plurality of through-holes; wherein said retainer comprises a single-flip symmetrical snap lock.

2. The system of claim 1, further comprising:
a safety label adapted to identify an orientation of conductors.

3. The system of claim 1, further comprising:
a plurality of electrical conductors adapted to be restrained by said retainer.

4. The system of claim 1, further comprising:
a circuit breaker adapted to receive conductors retained by said retainer.

5. The system of claim 1, further comprising:
a circuit breaker adapted to receive conductors retained by said retainer; and
an electrical panel adapted to receive said circuit breaker.

6. The system of claim 1, wherein said retainer comprises a hinge.

7. The system of claim 1, wherein said retainer comprises a double-flip symmetrical snap lock.

8. The system of claim 1, wherein said first part is a top portion of said retainer.

9. The system of claim 1, wherein said second part is a bottom portion of said retainer.

10. The system of claim 1, wherein said first part is a side portion of said retainer.

11. The system of claim 1, wherein said retainer is adapted to electrically couple said conductor to a circuit breaker before said circuit breaker is installed in an electrical panel.

12. The system of claim 1, wherein said first part and said second part are coupleable without a tool.

13. The system of claim 1, wherein said first part and said second part require a tool for separation after said first part and said second part are coupled.

14. The system of claim 1, wherein at least one of said first part and said second part are made from a thermoplastic material.

* * * * *